United States Patent [19]

Parker

[11] Patent Number: 4,536,800
[45] Date of Patent: Aug. 20, 1985

[54] ADDITIVE PULSE SAMPLING CIRCUIT

[75] Inventor: Robert P. Parker, Indianapolis, Ind.

[73] Assignee: RCA Corporation, Princeton, N.J.

[21] Appl. No.: 445,513

[22] Filed: Nov. 30, 1982

[51] Int. Cl.³ .......................... H04N 5/68; H04N 9/16
[52] U.S. Cl. ...................................... 358/243; 358/27; 358/74; 358/172
[58] Field of Search ...................... 358/10, 172, 29, 33, 358/64, 171, 65, 139, 168, 169, 242, 243; 328/150, 151, 168, 169, 171, 172, 175; 307/352, 353

[56] References Cited

U.S. PATENT DOCUMENTS

| | | | |
|---|---|---|---|
| 4,277,798 | 7/1981 | Hinn | 358/33 |
| 4,331,981 | 5/1982 | Parker | 358/243 |
| 4,331,982 | 5/1982 | Parker | 358/243 |
| 4,387,405 | 6/1983 | Hinn | 358/243 |
| 4,484,228 | 11/1984 | Parker | 358/243 |

Primary Examiner—Tommy P. Chin
Attorney, Agent, or Firm—P. J. Rasmussen; P. M. Emanuel; R. H. Kurdyla

[57] ABSTRACT

An input pulse having an amplitude to be sampled is coupled to a sampling amplifier via an input circuit including a capacitance. A switch couples a reference voltage to the capacitance during reference intervals preceding sampling intervals. The reference voltage is decoupled at the end of the reference interval, at which time an auxiliary reference pulse is self-generated at the amplifier input by passive circuit elements associated with the input circuit. The auxiliary pulse exhibits an amplitude and sense for negating the response of the amplifier to the input pulse when the input and reference pulses exhibit mutually equal amplitudes at the amplifier input.

19 Claims, 7 Drawing Figures

ADDITIVE PULSE SAMPLING CIRCUIT

This invention concerns an electrical signal sampling circuit.

In many electrical signal processing systems there is a need to periodically sample information (e.g., signal amplitude) manifested by signals processed by the system. The information to be sampled is often represented by a signal level which varies in magnitude with respect to a given nominal level. The given level may, for example, correspond to a correct or desired condition of the information being sampled. The signal to be sampled often exhibits a non-zero nominal level, and different levels (i.e., more or less positive) in accordance with variations of the information being sampled relative to the nominal level.

The signal to be sampled is processed by a sampling amplifier which charges or discharges a storage capacitor in accordance with the magnitude of the sampled signal. The voltage across the storage capacitor should remain unchanged when the sampled signal exhibits the nominal level. This condition requires that the storage capacitor be neither charged nor discharged by output currents from the sampling amplifier when the sampled signal exhibits the nominal (non-zero) level. This result can be accomplished by offsetting the bias of the sampling amplifier, such as by means of a pre-set manually adjustable potentiometer coupled to a bias control point of the sampling amplifier and adjusted on a unit-to-unit basis. Another technique for accomplishing this result employs a separate, keyed source of periodic auxiliary signals developed during intervals when the information to be sampled is being processed. The auxiliary signal is applied to the input of the sampling amplifier, and exhibits a magnitude and sense for negating the response of the sampling amplifier to the signal being sampled when the magnitude of the signal being sampled corresponds to the nominal level. In such case the conduction of the sampling amplifier and the voltage on the storage capacitor remain unchanged. The latter technique is described in my U.S. Pat. No. 4,484,228 titled "Signal Processing Network for an Automatic Kinescope Bias Control System", filed Oct. 14, 1982.

In accordance with the principles of the present invention, the auxiliary signal is developed periodically by means of passive circuit elements exclusive of an additional active source of auxiliary signals. An input pulse having an amplitude to be sampled is coupled to a sampling network via an input circuit. A bias current derived from a reference source is applied to the input circuit during reference intervals preceding sampling intervals to establish a sampling reference bias condition. The bias current is decoupled at the end of the reference interval, at which time an auxiliary reference pulse is self-generated at the input of the sampling network by means of passive circuit elements associated with the input circuit. The auxiliary pulse exhibits a magnitude and sense for negating the response of the sampling network to the input pulse when the magnitudes of the input and reference pulses exhibit a prescribed mutual relationship at the input of the sampling network.

Figure 1:
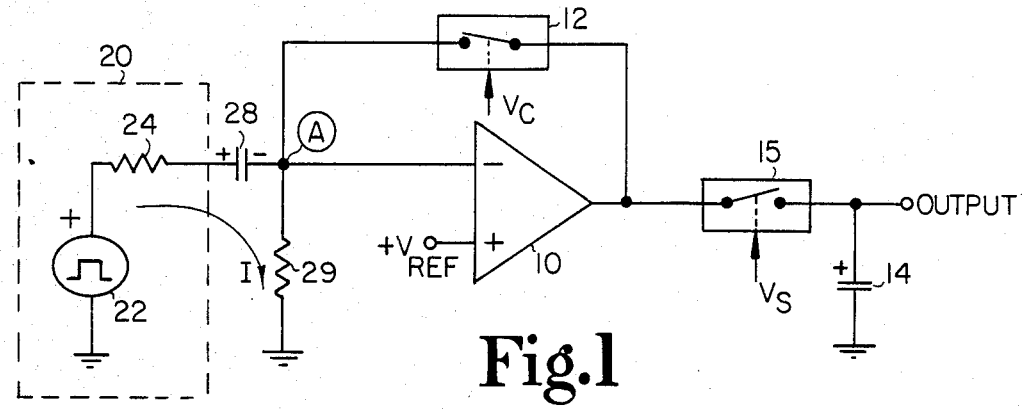
FIG. 1 shows an embodiment of a sampling circuit according to the principles of the present invention.

Referring to FIG. 1, a high input impedance sampling amplifier 10 (e.g., an operational amplifier) has an inverting signal input (−) for receiving signals to be sampled, and a non-inverting input (+) coupled to a source of positive DC reference voltage $V_{REF}$. Amplifier 10 can be either a voltage amplifier, or a transconductance amplifier which provides output currents in response to input voltage variations. A feedback clamping switch 12 operates in response to a clamping control signal $V_C$ for selectively coupling the output of amplifier 10 to its inverting signal input during periodic signal clamping (referencing) intervals which precede signal sampling intervals. During sampling intervals, the output of amplifier 10 is selectively coupled to an average responding (integrating) storage capacitor 14 via a sampling switch 15 which responds to a sampling control signal $V_S$.

Input signals to be sampled are provided to amplifier 10 by means of an input circuit comprising a signal source 20, an AC signal coupling capacitor 28, and a resistor 29 coupled between a node A at the junction of capacitor 28 and the signal input of amplifier 10, and ground. Signal source 20 comprises a voltage source 22 and an associated source impedance designated by a resistor 24. The value of resistor 24 is preferably significantly less than the value of resistor 29. For the purpose of the following discussions it is assumed that signal source 22 provides a positive DC level greater than $V_{REF}$ during clamping intervals, and during sampling intervals provides an incremental positive pulse with an amplitude to be sampled superimposed on the positive DC level. The amplitude of the input pulse varies with respect to a nominal amplitude level, and is sampled by amplifier 10 to develop a related voltage across storage capacitor 14.

The operation of the circuit during the clamping interval establishes a sampling reference bias condition for sampling amplifier 10. Specifically, clamp switch 12 is rendered conductive (i.e., closed) whereby switch 12 couples the output of amplifier 10 to the signal input of amplifier 10. The negative terminal of input capacitor 28 charges in response to current conducted by switch 12, and exhibits a voltage substantially equal to $V_{REF}$ before the clamping interval ends, as indicated by waveform 2a of FIG. 2 which illustrates the voltage waveform at node A. At this time (i.e., immediately before the clamping interval ends) both inputs of amplifier 10 are balance biased at $V_{REF}$ potential, and the voltage across capacitor 28 is determined by the difference between the DC voltage at its negative terminal ($V_{REF}$) and the DC voltage at its positive terminal (related to the nominal DC level exhibited by source 22 during the clamping reference interval). During the clamping reference interval, resistor 29 conducts a current equal to $V_{REF}$ divided by the value of resistor 29, and the input current of high input impedance amplifier 10. It is assumed that the input current of amplifier 10 is negligibly small. Thus before the clamping interval ends the current flowing in resistor 24 is substantially zero, resistor 29 conducts a current as noted, and switch 12 conducts a current as required to maintain the negative terminal of capacitor 28 at $V_{REF}$ potential via feedback action. The charge on the negative terminal of capacitor 28 and the current conducted by resistor 29 are maintained by the current conducted by switch 12 over the clamping reference interval.

The end of the clamping interval is preferably separated from the beginning of the sampling interval by a small time delay, e.g., on the order of 200 nanoseconds (not shown). When switch 12 is rendered non-conductive at the end of the clamping interval, the input circuit including source 22, resistance 24, capacitor 28 and resistor 29 represents a series conductive circuit in which a series current I is caused to flow in response switch 12 opening. Current I induced by the opening of switch 12 causes a voltage drop to be developed across resistor 24, and a related voltage decrease is developed at node A and across resistor 29. More specifically, at this time the positive terminal of capacitor 28 exhibits a voltage corresponding to the DC voltage provided by source 22 less the voltage drop across resistor 24, and the negative terminal of capacitor 28 exhibits a voltage corresponding to $V_{REF}$ less the voltage drop across resistor 24. The voltage across capacitor 28 does not change immediately upon opening switch 12 since the voltage across a capacitor cannot be changed instantaneously. Input current conducted by amplifier 10 is negligible because of the very high input impedance of amplifier 10. The decreased voltage developed at node A when switch 12 opens is given by the expression $$\frac{R_{29}}{R_{24} + R_{29}} (V_{DC} - V_C)$$

where $R_{24}$ and $R_{29}$ respectively correspond to the values of resistors 24 and 29;

$V_{DC}$ corresponds to the nominal positive DC voltage level from source 22 prior to the sampling interval; and $V_C$ is the voltage across capacitor 28.

The decreased voltage developed at node A due to opening switch 12 is designated by negative-going amplitude transition $A_1$ in waveform 2a, which omits the pulse to be sampled which appears during the sampling interval (the latter pulse is shown in FIG. 2b and will be discussed subsequently). The decreased voltage at node A corresponds to a negative-going auxiliary reference pulse of amplitude $A_1$ encompassing the sampling interval. The amplitude $A_1$ of this pulse is not absolutely constant due to slight discharging of the negative terminal of capacitor 28 via resistor 29 during the sampling interval. However, the effects of discharging capacitor 28 over the sampling interval are negligible, so that amplitude $A_1$ is substantially constant over the sampling interval, since the discharging time constant determined by $(R_{24}+R_{29}) \times C_{28}$ is significantly greater than the duration of the sampling interval.

Waveform 2b depicts the input pulse to be sampled as provided by source 22 during the sampling interval. The input pulse exhibits a positive amplitude which varies by amounts $\pm \Delta$ with respect to a nominal amplitude $A_2$.

Waveforms 2c, 2d and 2e depict the input signal of amplifier 10 resulting from the combination (i.e., superposition) of input pulse $A_2$ and auxiliary pulse $A_1$ at node A during the sampling interval, for three amplitude conditions of input pulse $A_1$. The input to amplifier 10 does not change relative to the clamping reference level ($V_{REF}$) when the positive-going amplitude of the input pulse ($A_2$) equals the negative-going amplitude of the auxiliary reference pulse ($A_1$) at node A, as indicated by waveform 2c. In this case the positive and negative amplitudes of these pulses mutually cancel at node A, whereby the voltage across output storage capacitor 14 does not change. However, when the input pulse exhibits amplitudes of $A_2+\Delta$ and $A_2-\Delta$ at node A, the resulting signal input to amplifier 10 respectively increases and decreases by an amount $\Delta$, as indicated by waveforms 2d and 2e respectively, causing a related change in the voltage across output storage capacitor 14. The voltage change across output capacitor 14 is related to the amount by which the amplitude of the input pulse is greater or less than ($\pm \Delta$) the amplitude of the auxiliary pulse.

Figure 3:
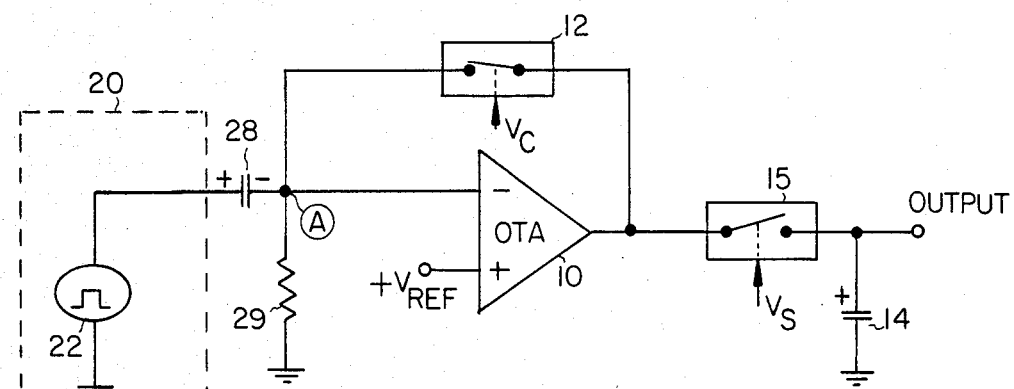
FIG. 3 shows an alternative embodiment of a sampling circuit according to the present invention.
Figures 4, 5, 6:
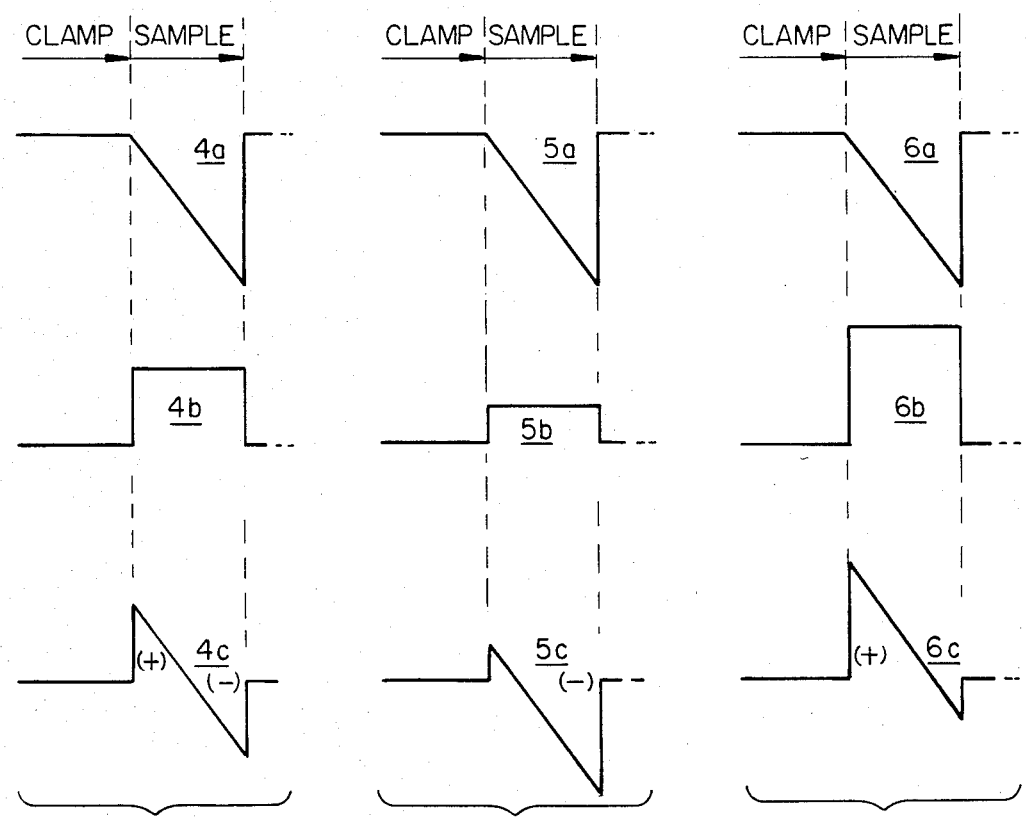
FIGS. 4–6 illustrate waveforms associated with the operation of the sampling circuit in FIG. 3.

FIG. 3 depicts an alternative version of the sampling circuit shown in FIG. 1, wherein corresponding elements are designated by the same reference number. The arrangement of FIG. 3 does not include an input voltage dropping impedance corresponding to resistor 24 in the FIG. 1 circuit, and employs alternative means for generating the auxiliary pulse. In FIG. 3, amplifier 10 corresponds to an operational transconductance amplifier (OTA), and output signals from source 22 are applied to capacitor 28 via a negligibly small source impedance (e.g., the emitter output impedance of an emitter follower transistor stage). Transconductance amplifier 10 can be of the type shown in my U.S. Pat. No. 4,331,981, for example. The circuit of FIG. 3 operates during the clamping interval in the same manner as the circuit of FIG. 1 discussed previously. FIGS. 4-6 illustrate waveforms associated with the sampling interval operation of the FIG. 3 circuit for three conditions of input pulse amplitude. Waveforms 4a, 5a and 6a, respectively associated with FIGS. 4, 5 and 6, are identical.

Referring to FIG. 4, during the sampling interval the negative terminal of capacitor 28 discharges via resistor 29 from $V_{REF}$ (as established during the clamping interval), to produce a negative-going voltage ramp in the form of a triangular-shaped pulse at point A over the sampling interval, as shown by waveform 4a. The values of resistor 29 and capacitor 28 are chosen to produce a discharge time constant which is greater than the duration of the sampling interval. The negative-going voltage ramp can be made substantially linear if the discharge time constant is significantly greater than the duration of the sampling interval. The positive-going input pulse to be sampled (waveform 4b) is coincident with the triangular pulse at node A. The input signal to amplifier 20 corresponds to the superposition of the input pulse and the auxiliary triangular pulse at node A. That is, the rectangular pulse and the auxiliary triangular pulse represent the components of a composite input pulse at node A.

The waveforms of FIG. 4 correspond to a condition of an input pulse 4b of a nominal amplitude. In this case the area defined by input pulse 4b over the sampling interval substantially equals the area defined by triangular pulse 4a over the sampling interval. Waveform 4c depicts the amplifier input signal resulting at node A due to the additive combination of triangular pulse 4a and input pulse 4b. Since these pulses exhibit equal areas, resulting input signal 4c comprises positive-going and negative-going triangular pulse components of mutually equal areas. Thus resulting input signal 4c exhibits an average DC value of substantially zero. Accordingly, the average output current provided by amplifier 10 over the sampling interval is substantially zero, whereby the average voltage across output storage capacitor 14 does not change.

In FIG. 5, the input pulse designated by waveform 5b exhibits an amplitude less than (i.e., less positive than) that of input pulse 4b. In this case amplifier input signal 5c resulting from the combination of input pulse 5b and triangular pulse 5a exhibits positive and negative triangular pulse components of unequal area and amplitude. Specifically, the amplitude of the negative-going triangular pulse component of amplifier input signal 5c is greater than the positive-going triangular pulse component. Thus the average DC value of resulting amplifier input signal 5c is more negative relative to resulting input signal 4c, whereby amplifier 10 conducts output current with a sense for charging storage capacitor 14 in proportion to the magnitude of the more negative average value of the amplifier input signal. The more negative average value of the amplifier input signal, and the amount by which the voltage on capacitor 14 is increased, are representative of the amount by which the amplitude of the input pulse (5b) is less than the nominal input pulse amplitude (4b).

The waveforms of FIG. 6 correspond to a condition wherein the amplitude of the input pulse (waveform 6b) is greater than (i.e., more positive than) the nominal amplitude of the input pulse of waveform 4b. In this case the combination of the input pulse (6b) and the negative-going triangular pulse (6a) at node A results in an amplifier input signal (6c) with a positive-going triangular pulse component with an amplitude greater than that of the negative-going triangular pulse component. Thus the average DC value of resulting amplifier input signal 6c is more positive relative to resulting input signal 4c, whereby amplifier 10 conducts output current with a sense for discharging output storage capacitor 14 in proportion to the magnitude of the more positive average value of the amplifier input signal. The more positive average value of the amplifier input signal, and the related amount by which the voltage on capacitor 14 is decreased, are representative of the amount by which the amplitude of the input pulse (6b) exceeds the nominal input pulse amplitude (4b).

In the case of both of the embodiments of FIGS. 1 and 3, an auxiliary pulse is self-generated by means of passive circuit elements in response to the opening of a feedback clamping switch which is normally associated with the signal processing function of the sampling network. Additional active circuit elements such as a separate pulse generator (e.g., comprising keyed circuits) are advantageously not required to generate the auxiliary reference pulse.

An opposite polarity (positive-going) auxiliary pulse can be generated by connecting resistor 29 to a source of positive potential greater than $V_{REF}$ instead of ground potential, e.g., when the input pulse to be sampled exhibits a negative-going amplitude.

Resistor 29 can be arranged external to amplifier 10 as shown, or may be included within amplifier 20. Also, the current conducted by resistor 29 can correspond to the input bias current of amplifier 10, particularly when the input impedance of amplifier 10 is not very high and the amplifier input current is not negligible (e.g., when the input transistors of amplifier 10 are low current gain devices).

In the arrangement of FIG. 3, a transconductance amplifier is preferably used for sampling amplifier 10, since a transconductance amplifier predictably permits the voltage across output capacitor 14 to correspond to the average of the amplifier input signal. The output circuit of transconductance amplifier includes current sourcing and current sinking transistor devices for respectively conducting currents with a sense for charging and discharging the output storage capacitor in accordance with the sense of the amplifier input signal. In general, the use of a low output impedance voltage amplifier for sampling amplifier 10 in the arrangement of FIG. 3 is considered to be less acceptable compared to use of a transconductance amplifier. However, the use of a voltage amplifier in the arrangement of FIG. 3 may give acceptable results in some systems if the time constant determined by the output impedance of the voltage amplifier and the value of the output storage capacitor is much longer than the duration of the sampling interval.

Figure 7:
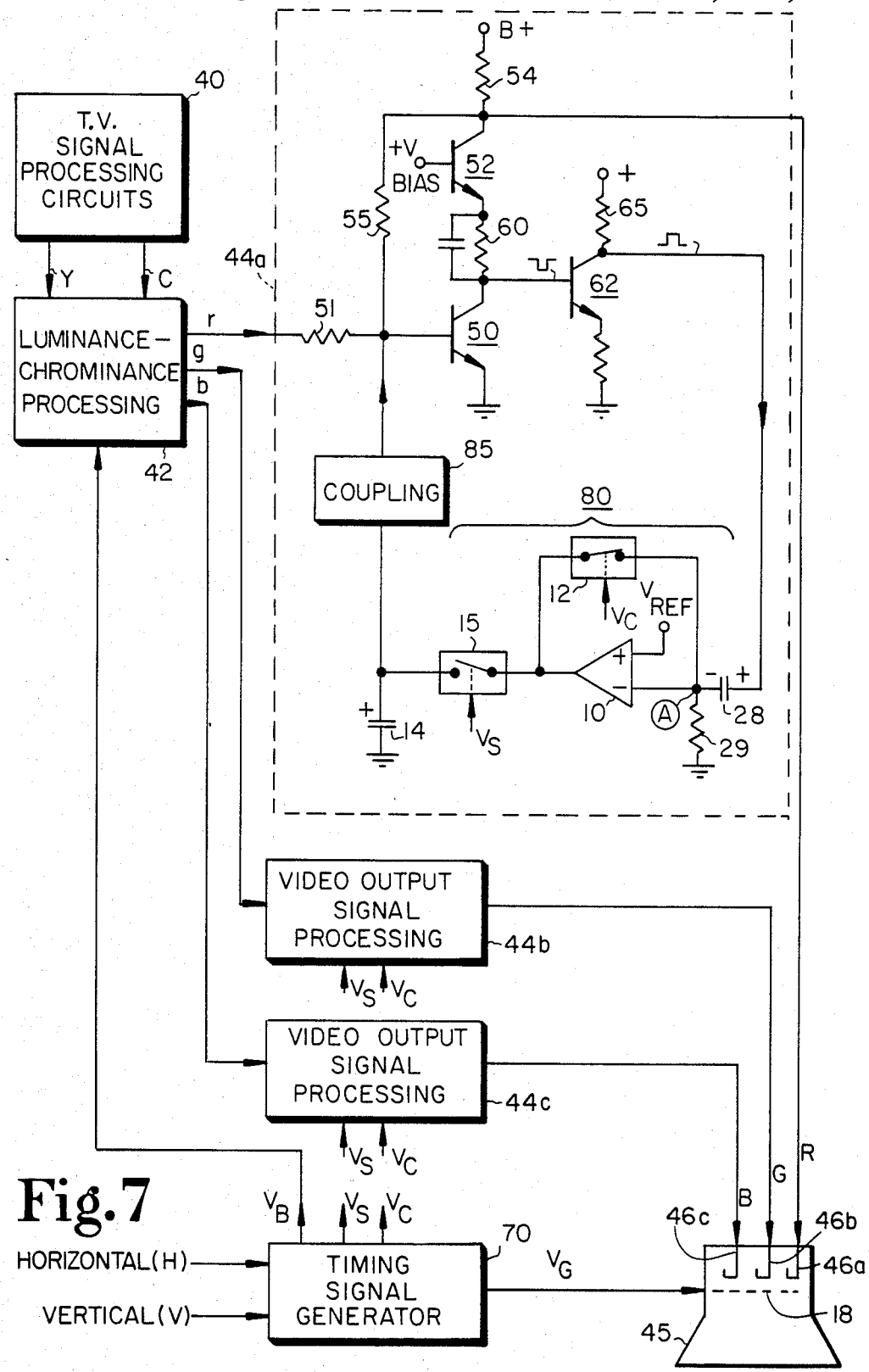
FIG. 7 depicts a portion of a television receiver including an automatic kinescope bias control system comprising a sampling circuit of the type shown in FIG. 1.

FIG. 7 shows a portion of a television receiver including an automatic kinescope bias (AKB) control system employing the signal clamping and sampling network of FIG. 1.

Television signal processing circuits 40 provide separated luminance (Y) and chrominance (C) components of a composite color television signal to a luminance-chrominance signal processing network 42. Processor 42 includes luminance and chrominance gain control circuits, DC level setting circuits (e.g., comprising keyed black level clamping circuits), color demodulators for developing r-y, g-y and b-y color difference signals, and matrix amplifiers for combining the latter signals with processed luminance signals to provide low level color image representative signals r, g and b. These signals are amplified and otherwise processed by circuits within video output signal processing networks 44a, 44b and 44c, respectively, which supply high level amplified color image signals R, G and B to respective cathode intensity control electrodes 46a, 46b and 46c of a color kinescope 45. Networks 44a, 44b and 44c also perform functions related to the AKB operation, as will be discussed. Kinescope 45 is of the self-converging in-line gun type with a commonly energized control grid 48 associated with each of the electron guns comprising cathode electrodes 46a, 46b and 46c.

Since output signal processors 44a, 44b and 44c are similar in this embodiment, the following discussion of the operation of processor 44a also applies to processors 44b and 44c.

Processor 44a includes a kinescope driver stage comprising an input common emitter amplifier transistor 50 which receives video signal R from processor 42 via an input resistor 51, and an output high voltage common base amplifier transistor 52 which together with transistor 50 forms a cascode video driver amplifier. High level video signal R, suitable for driving kinescope cathode 46a, is developed across a load resistor 54 in the collector output circuit of transistor 52. Direct current negative feedback for driver 50, 52 is provided by means of a resistor 55. A sensing resistor 60 DC coupled in series with and between the collector-emitter paths of transistors 50, 52 serves to develop a voltage, at a relatively low voltage sensing node at the collector of transistor 50, representing the level of kinescope cathode black image current conducted during kinescope blanking intervals. Resistor 60 functions in conjunction with the AKB system of the receiver, which will now be described.

A timing signal generator 70 containing combinational and sequential logic control circuit as well as level shifting circuits responds to periodic horizontal synchronizing rate signals (H) and to periodic vertical synchronizing rate signals (V), both derived from deflection circuits of the receiver, for generating timing signals $V_B$, $V_S$, $V_C$ and $V_G$ which control the operation of the AKB function during periodic AKB intervals. Each AKB interval begins shortly after the end of the vertical retrace interval within the vertical blanking interval, and encompasses several horizontal line intervals also within the vertical blanking interval and during which video signal image information is absent. Timing signal generator 70 can be constructed using techniques disclosed in U.S. Pat. No. 4,277,798—Hinn, titled "Automatic Kinescope Biasing System with Increased Interference Immunity", for example. Timing signal $V_B$ is used to inhibit video signals during AKB operating intervals, and comprises a pulse generated soon after the vertical retrace interval ends. Signal $V_B$ exists for the duration of the AKB interval and is applied to a blanking control input terminal of luminance-chrominance processor 42 for causing the r, g and b outputs of processor 42 to exhibit a DC reference level corresponding to a black video image condition. This can be accomplished by reducing the signal gain of processor 42 to substantially zero via the gain control circuits of processor 42 in response to signal $V_B$, and by modifying the DC level of the video signal processing path via the DC level control circuits of processor 42 to produce a black image representative reference level at the signal outputs of processor 42. Timing signal $V_G$, used as a positive kinescope grid drive pulse, encompasses a few (e.g., three) horizontal line intervals within the vertical blanking interval. Timing signal $V_C$ is used to control the operation of a clamping circuit associated with the signal sampling function of the AKB system. Timing signal $V_S$, used as a sampling control signal, occurs after signal $V_C$ and serves to time the operation of a sample and hold circuit which develops a DC bias control signal for controlling the kinescope cathode black current level. Signal $V_S$ encompasses a sampling interval (e.g., three horizontal line intervals) the beginning of which is slightly delayed relative to the end of the clamping interval encompassed by clamping control signal $V_C$, and the end of which substantially coincides with the end of the AKB interval.

During the AKB sampling interval, positive pulse $V_G$ (e.g., on the order of +10 volts) biases kinescope grid 48 for causing the electron gun comprising cathode 46a and grid 48 to increase conduction. At times other than the AKB intervals, signal $V_G$ provides the normal, less positive, bias for grid 48. In response to positive grid pulse $V_G$, a similarly phased, positive current pulse appears at cathode 46a during the grid pulse interval, which corresponds to the sampling interval. The amplitude of the cathode output current pulse so developed is proportional to the level of cathode black current conduction (typically a few microamperes).

The induced positive cathode output pulse appears at the collector of transistor 52, and is coupled to the base input of transistor 50 via feedback resistor 55, causing the current conduction of transistor 50 to increase proportionally while the cathode pulse is present. The increased current conducted by transistor 50 causes a voltage to be developed across sensing resistor 60. This voltage is in the form of a negative-going voltage change which appears at the collector of transistor 50 and which is proportional in magnitude to the magnitude of the black current representative cathode output pulse. The magnitude of the voltage change at the collector of transistor 50 is determined by the product of the value of resistor 60 times the magnitude of the incremental current flowing through resistor 60.

The voltage change at the collector of transistor 50, essentially a negative-going voltage pulse, is converted to a positive-going voltage pulse by means of a signal inverter comprising a transistor 62 (e.g., a unity gain stage). The positive-going black current representative pulse is developed across a collector load resistor 65, and is applied to an AKB bias control signal processor 80 which comprises a signal clamping and sampling network of the type shown in FIG. 1 and discussed previously. Corresponding elements are identified by the same reference number. Network 80 operates as follows.

During the AKB clamping reference interval which precedes the sampling interval, switches 15 and 12 are respectively open and closed, and a nominal DC voltage corresponding to a black level image condition is developed at the collector outputs of transistors 50 and 62 in response to the related black level representative DC voltage applied to transistor 50 from the r signal output of processor 42. The positive terminal of AC coupling capacitor 28 is charged to the nominal DC voltage, and the negative terminal of capacitor 28 is charged to reference voltage $V_{REF}$ via the feedback clamping network including amplifier 10 and conductive switch 12. Thus the inputs of amplifier 10 are balanced and a reference bias condition is established for amplifier 10 during the clamping interval.

Figure 2:
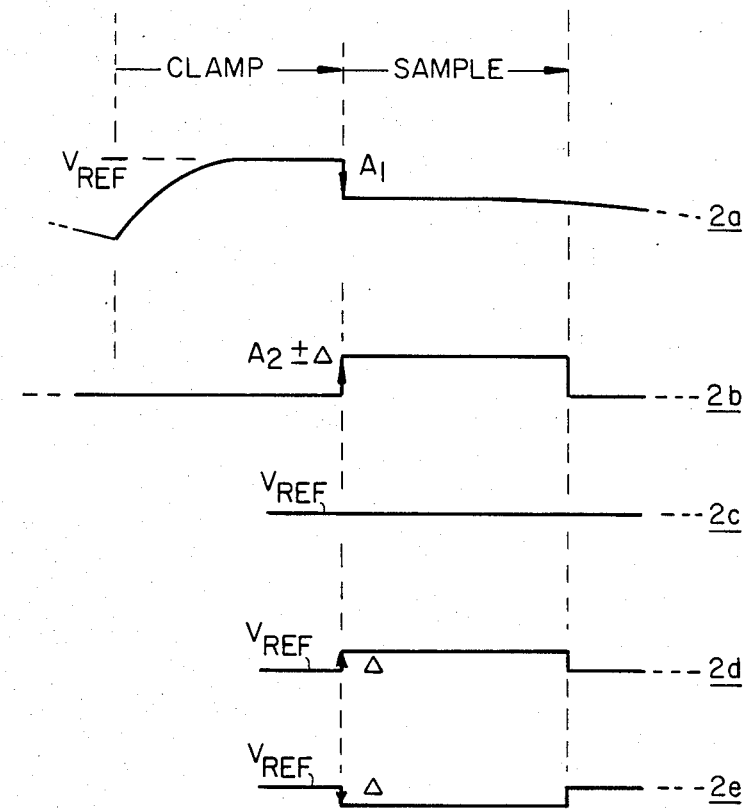
FIG. 2 shows waveforms associated with the operation of the sampling circuit in FIG. 1.

When feedback switch 12 opens at the end of the clamping reference interval, a negative-going auxiliary reference pulse is developed at node A at the signal input of amplifier 10, as previously discussed in connection with FIG. 1 and waveform 2a of FIG. 2. In this example, the collector impedance of transistor 62 comprising resistor 65 corresponds to source resistance 14 in the arrangement of FIG. 1. During the following sampling interval, the positive-going black current representative voltage pulse is coupled via transistor 62 and capacitor 28 to node A, where the positive representative pulse combines with the negative auxiliary reference pulse at node A. As a result of this pulse combination during the sampling interval, the input voltage to amplifier 10 increases or decreases in accordance with waveforms 2d or 2e if the kinescope black current level is incorrect, or the input voltage will remain unchanged (i.e., at $V_{REF}$ potential) in accordance with waveform 2c if the black current level is correct.

For example, a correct black current level is considered to exist if the positive representative pulse and the negative auxiliary reference pulse exhibit mutually equal amplitudes when combined at input node A. In such case the conduction of amplifier 10 and the bias control voltage across output storage capacitor will remain unchanged. On the other hand, an excessively high black current level is considered to exist when the amplitude of the positive representative pulse is greater than the amplitude of the auxiliary reference pulse at input node A. In such case the input voltage to amplifier 10 will increase as indicated by waveform 2d, causing the conduction of amplifier 10 to change with a sense for modifying the voltage across storage capacitor 14 in a direction for reducing the input bias of kinescope driver transistor 50 so as to reduce the black level current conducted by the kinescope. For this purpose the bias control voltage across capacitor 14 is applied to transistor 50 via a coupling circuit 85 including appropriate level shifting networks. Observations analogous to the above pertain to a condition of excessively low black current, in which case the amplitude of the positive representative pulse is less than the amplitude of the negative auxiliary pulse at node A, and the input voltage to amplifier 10 decreases as indicated by waveform 2e.

What is claimed is:

1. In a signal processing system, apparatus operative during a reference interval and a subsequent sampling interval for sampling the magnitude of an input signal, comprising:
    sampling means for providing an output signal in accordance with the magnitude of input signals supplied thereto;
    input circuit means for coupling said input signal to an input of said sampling means;
    means for selectively coupling a bias current derived from a reference source to said input circuit means via a reference path during said reference interval to establish a sampling reference bias condition, and for decoupling said reference path at the end of said reference interval; and
    passive network means associated with said input circuit means for self-generating an auxiliary reference signal at said input of said sampling means in response to said reference path being decoupled at the end of said reference interval, said auxiliary reference signal exhibiting a magnitude and sense for substantially negating the response of said sampling means to said input signal when the magnitudes of said input signal and said auxiliary reference signal exhibit a prescribed mutual relationship.

2. Apparatus according to claim 1, wherein said input circuit comprises:
    a capacitance with a first terminal, and a second terminal coupled to said input of said sampling means;
    a first resistance for coupling said input signal having an amplitude to be sampled to said first terminal of said capacitance; and
    passive current conducting means coupled between said second terminal of said capacitance and an operating potential; wherein
    said bias current is selectively coupled via said reference path to said second terminal of said capacitance.

3. Apparatus according to claim 2, wherein said passive current conducting means comprises a second resistance coupled between said second terminal of said capacitance and an operating potential.

4. Apparatus according to claim 3, wherein said first and second resistances and said capacitance define a time constant which is long relative to the duration of said sampling interval.

5. Apparatus according to claim 1, wherein said sampling means comprises a transconductance amplifier for providing output current variations in response to input voltage variations.

6. Apparatus according to claim 5, wherein said input circuit comprises
    a capacitance with a first terminal, and a second terminal coupled to a signal input of said transconductance amplifier;
    means exhibiting a negligibly small impedance for coupling said input signals to be sampled to said first terminal of said capacitance; and
    passive current conducting means coupled between said second terminal of said capacitance and an operating potential; and wherein
    said bias current is selectively coupled via said reference path to said second terminal of said capacitance.

7. Apparatus according to claim 6, wherein said passive current conducting means and said capacitance define a time constant which is long relative to the duration of said sampling interval.

8. Apparatus according to claim 7, wherein said passive current conducting means effects a substantially linear change in the voltage at said second terminal of said capacitance during said sampling interval when said input signal to be sampled is present.

9. Apparatus according to claim 7, wherein said passive current conducting means comprises a resistance coupled between said second terminal of said capacitance and an operating potential.

10. Apparatus according to claim 7, wherein said input signal is substantially rectangular in configuration;
    said auxiliary reference signal is coincident with said input signal and exhibits a substantially triangular configuration; and
    said response of said sampling amplifier is substantially negated when said input signal and said auxiliary reference signal exhibit substantially equal areas at said input of said sampling amplifier.

11. In a video signal processing system including an image display device responsive to video signals applied thereto, apparatus for automatically controlling the magnitude of black image representative currents conducted by said image display device, said apparatus being operative during control intervals including a reference interval and a subsequent sampling interval, and comprising:
    means for deriving a signal representative of the magnitude of said black image currents;
    sampling means for providing a control signal to said image display device in accordance with the magnitude of input signals supplied to said sampling means;
    input circuit means for coupling said derived representative signal to an input of said sampling means;
    means for selectively coupling a bias current derived from a reference source to said input circuit means via a reference path to establish a sampling reference bias condition, and for decoupling said reference path at the end of said reference interval; and
    passive network means associated with said input circuit means for self-generating an auxiliary reference signal at said input of said sampling means in response to said reference path being decoupled at the end of said reference interval, said auxiliary reference signal exhibiting a magnitude and sense for substantially negating the response of said sampling means to said derived representative signal when the magnitudes of said input signal and said auxiliary reference signal exhibit a prescribed mutual relationship.

12. Apparatus according to claim 11, wherein
said response of said sampling means to said derived representative signal is substantially negated when the magnitudes of said input signal and said auxiliary reference signal are substantially equal, corresponding to a condition of a correct black image current level.

13. In a video signal processing system including an image display device responsive to video signals applied thereto, apparatus for automatically controlling the magnitude of black image representative currents conducted by said image display device, said apparatus being operative during control intervals including a reference interval and a subsequent sampling interval and comprising:

means for deriving a signal representative of the magnitude of said black image currents;

sampling means for providing a control signal to said image display device in accordance with the magnitude of input signals supplied to said sampling means;

input circuit means for coupling said derived representative signal to an input of said sampling means;

means for selectively coupling a bias current derived from a reference source to said input circuit means via a reference path to establish a sampling reference bias condition, and for decoupling said reference path at the end of said reference interval; and passive network means associated with said input circuit means for self-generating an auxiliary reference signal at said input of said sampling means in response to said reference path being decoupled at the end of said reference interval, said auxiliary signal exhibiting a magnitude and sense for substantially negating the response of said sampling means to said derived representative signal when the magnitudes of said input signal and said auxiliary signal exhibit a prescribed mutual relationship, the response of said sampling means to said derived representative signal being substantially negated when the magnitudes of said input signal and reference signal are substantially equal, corresponding to a condition of a correct black image current level; wherein said input circuit comprises:

a capacitance with a first terminal, and a second terminal coupled to said input of said sampling means;

a first resistance for coupling said derived signal to said first terminal of said capacitance; and passive current conducting means coupled between said second terminal of said capacitance and an operating potential; wherein said bias current is selectively coupled via said reference path to said second terminal of said capacitance.

14. Apparatus according to claim 13, wherein
said passive current conducting means comprises a second resistance coupled between said second terminal of said capacitance and an operating potential.

15. Apparatus according to claim 14, wherein
said first and second resistances and said capacitance define a time constant which is long relative to the duration of said sampling interval.

16. In a signal processing system, apparatus operative during a reference interval and a subsequent sampling interval for sampling the magnitude of an input signal, comprising a source of reference potential;

a sampling amplifier with a signal input, a reference input coupled to said source of reference potential, and an output for providing an output signal in accordance with the magnitude of signals applied to said signal input;

an input circuit for coupling input signals to be sampled to said amplifier signal input, said input circuit comprising an input signal coupling capacitance with a first terminal for receiving said input signal and a second terminal coupled to said amplifier signal input;

a resistance for coupling said input signal to said first terminal of said capacitance; and current conducting means coupled from said second terminal of said capacitance to an operating potential;

switch means for selectively (a) coupling said output of said amplifier to said second terminal of said capacitance at said amplifier signal input via a reference path during said reference interval for establishing a reference bias condition for said amplifier signal input, the voltage at said second terminal of said capacitance and the current conducted by said current conducting means during said reference interval being determined by currents conducted by said switch means during said reference interval; and (b) decoupling said reference path at the end of said reference interval; and passive network means comprising said input circuit for self-generating an auxiliary reference signal at said amplifier signal input in response to said reference path being decoupled at the end of said reference interval, said auxiliary reference signal exhibiting a magnitude and sense for substantially negating the response of said amplifier to said input signal when the magnitudes of said input signal and said auxiliary reference signal exhibit a prescribed mutual relationship.

17. Apparatus according to claim 16, wherein
said current conducting means comprises a resistance which with said capacitance defines a time constant which is long relative to the duration of said sampling interval.

18. Apparatus according to claim 16, wherein
said input signal coupling resistance is negligibly small;

said amplifier comprises a transconductance amplifier for providing output current variations in response to input voltage variations; and said current conducting means comprises a resistance which with said capacitance defines a time constant which is long relative to the duration of said sampling interval.

19. Apparatus according to claim 18, wherein
said current conducting means effects a substantially linear change in the voltage at said second terminal of said capacitance during said sampling interval when said input signal to be sampled is present.

* * * * *